United States Patent [19]

Zehner

[11] Patent Number: 5,546,357
[45] Date of Patent: Aug. 13, 1996

[54] MONOSTATIC PROJECTOR SYNTHETIC APERTURE SONAR

[75] Inventor: William J. Zehner, Lynn Haven, Fla.

[73] Assignee: The United States of America as represented by the Secretary of the Navy, Washington, D.C.

[21] Appl. No.: 363,990

[22] Filed: Dec. 27, 1994

Related U.S. Application Data

[63] Continuation of Ser. No. 83,609, Jun. 30, 1993, abandoned.
[51] Int. Cl.⁶ .............................. G01S 15/89; G01S 13/90
[52] U.S. Cl. .............................. 367/88; 342/25
[58] Field of Search .............................. 342/25; 367/88

[56] References Cited

U.S. PATENT DOCUMENTS

| | | | |
|---|---|---|---|
| 3,895,381 | 7/1975 | Kock | 367/88 |
| 4,199,746 | 4/1980 | Jones et al. | 367/88 |
| 4,493,064 | 1/1985 | Odero et al. | 367/92 |
| 4,987,563 | 1/1991 | Gilmour | 367/88 |

Primary Examiner—Ian J. Lobo
Attorney, Agent, or Firm—William C. Townsend; Edward J. Connors, Jr.; Kenneth W. Dobyns

[57] ABSTRACT

A pulsed-transmission, echo-ranging sonar system of the side scanning type uses a synthetic aperture to form search beams. The system uses multiple projectors, and a multistatic hydrophone array and a four transmission sequence, each originating at the same location thus permitting a shorter array which can travel twice as fast as conventional systems while achieving grating lobe suppression.

6 Claims, 8 Drawing Sheets

MONOSTATIC PROJECTOR SYNTHETIC APERTURE SONAR

This application is a continuation of application Ser. No. 08/083,609, filed Jun. 30, 1993, now abandoned.

BACKGROUND OF THE INVENTION

This invention relates to pulsed-transmission, echo-ranging sonar systems, and more particularly, to the class of side-scanning sonars that use a synthetic aperture to form search beams. The primary objective of this invention is to allow a hydrophone array of length L to move a distance equal to one complete array length between each transmission rather than only one half the array length as is the case with conventional synthetic aperture sonar (SAS). A further objective is that the projector element need not be physically longer than the distance moved between transmissions, L.

A third objective is to minimize the length of the real hydrophone array as well as the number of elements in the array for any given resolution requirement.

Another objective is to minimize the size of the projector elements.

Still another objective is to make maximum effective use of the limited length of any given towfish upon which the array is mounted.

A further objective of the invention is to allow the towfish velocity to double compared to a conventional SAS.

A further objective is that all this be accomplished so that the resulting beam patterns are of quality substantially identical to those from real (ideal) apertures of similar design requirements.

DETAILED DESCRIPTION OF THE PREFERRED EMBODIMENTS

Real Array. A real array is a set of physical transducer elements capable of transforming signals from some form of energy, such as acoustic, to an electrical form. Such signals can then be sampled and, by suitable manipulation, used to form directive beams in various directions. It will be well known to those skilled in the art that the length of an array required to produce an azimuthal resolution of $\Delta x$ is given by $$L = \frac{R\lambda}{\Delta x}$$

where $\lambda = c/f$ = wavelength in the medium.

R = range to target from the array.

Thus, the maximum array length is seen to be proportional to the required maximum range and inversely proportional to the required resolution and frequency. Absorption of sound in seawater increases as the square of frequency, so that increased range requirements translate to lower frequencies. To maintain a given amount of absorption losses, the maximum array length is proportional to $R_{max}^{3/2}$:

$$L_{max} \propto \frac{R_{max}^{3/2} C}{\Delta x}$$

In many cases, large Rmax requirements or small $\Delta x$ values may require an Lmax value that is physically longer than the available towfish. And this is the major motivation for forming synthetic apertures.

SYNTHETIC APERTURE SONAR (SAS)

Figure 1:
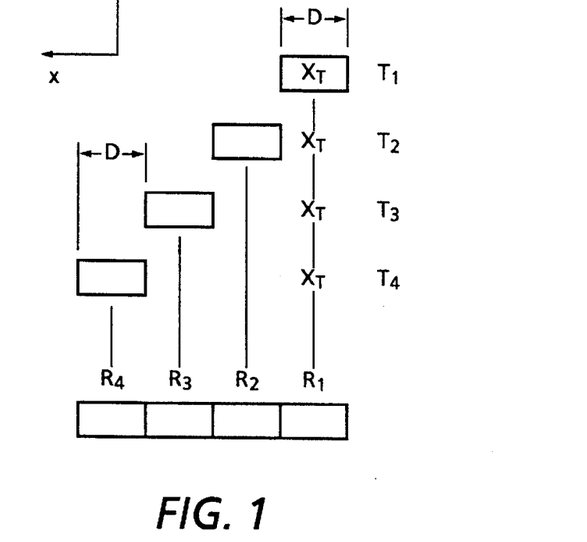
FIG. 1 is a view of a single element SAS.

It is easy to see that a single element can be used to form a synthetic array of arbitrary length, given a static, homogeneous system. Consider the element of length D in FIG. 1. A projector at an arbitrary location $X_t$ transmits when the hydrophone is at location R1. The time (range) sequence of echoes is recorded for later use. Then the hydrophone is moved left a distance D to location R2 and a second transmission, identical in phase and amplitude (coherent) to the first, is launched from the same location $X_t$ and the results recorded. After this is repeated Ne times, the recorded element data can be coherently added with focusing and steering applied as required to produce beams indistinguishable from those of a real, physical array. Note that in this example, the projector was monostatic (didn't move), while the hydrophone was multistatic (had various locations).

Figure 2:
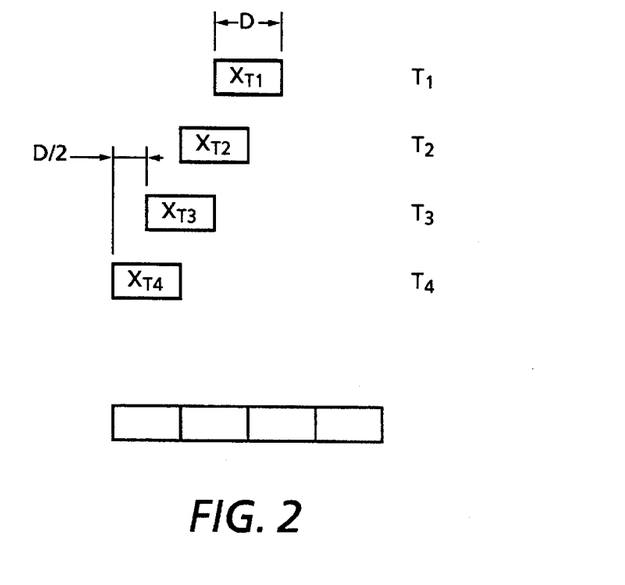
FIG. 2 is a view of a single element SAS showing motion.

If it is desired to scan a large area, the projector is usually allowed to move with the hydrophone, and in fact, the same element can be used to transmit and receive. A sequence of such transmit/receive cycles are shown in FIG. 2. It turns out that (reference 2) if the element length is D and it is moved a distance D/2 between successive transmissions, the array grating lobes, located at angles $$\theta_g \sin^{-1}\left(\frac{n\lambda}{2d}\right), n = 0, \pm 1, \pm 2, \ldots$$

where $$d = D/2$$

are substantially cancelled by the nulls in the element pattern, given by $$\theta_N = \sin^{-1}\left(\frac{n\lambda}{D}\right)$$

Thus, we wish to move a distance equal to half the element length between samples. It also turns out that, with this type of SAS processing, the length of the synthesized array, Ls, needs to be only half the length of a physical array to attain the same resolution:

$$Ls = \frac{L}{2}$$

This is because the two-way propagation delay, including both the transmit and return time for a multistatic projector is equivalent to a one-way (monostatic projector) SAS of twice the length. It can be shown that the multistatic SAS has an along track resolution of D/2. Thus, a very capable poor man's sides-scan sonar can be made with only a single transducer element.

However, the finite travel time of sound requires that the towfish velocity be set to $$v_p = \frac{C}{4} \frac{D}{R_{max}} = \frac{C}{2} \frac{\Delta x}{R_{max}}$$

to allow the sound to travel to and from a reflecting object.

This requirement severely limits the speed with which an area can be imaged. As a hypothetical example, if a resolution of 10 cm were required at a range of 100 m, the platform velocity would be only 75 cm/sec (1.5 knots). This restriction gave rise to a multi-element bistatic sampling system called Vernier synthetic aperture (VSAS).

VERNIER SAS

Figure 3:
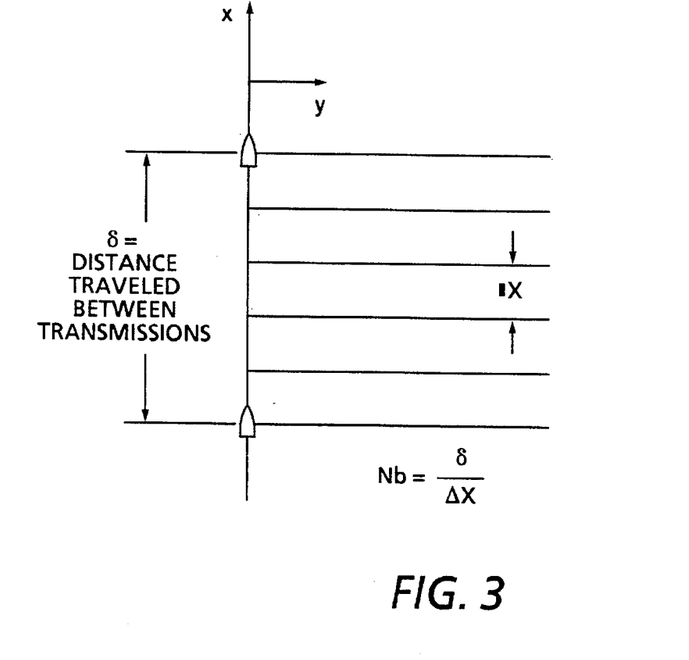
FIGS. 3 and 3a show vernier arrays and search field.
Figure 3A:
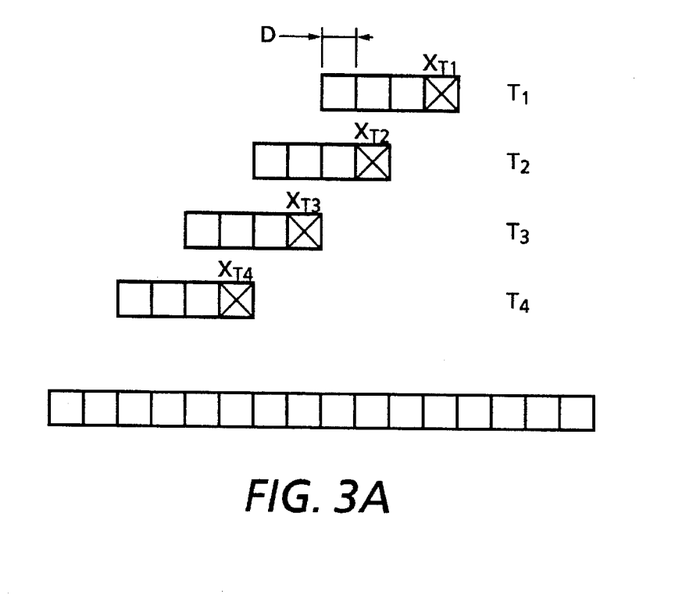

The single-element bistatic SAS concept can be easily extended to a multi-element case. FIG. 3A shows a real array of Ne elements of length D, periodically spaced at intervals D, one of which can be used as a projector. It can be shown that, if the towfish moves a distance of half the physical array length between transmissions, Ne D/2, then the same resolution (D/2) applies, but the array can proceed at a rate Ne times as fast as the single-element SAS. This significantly increases the potential area coverage rate. However, the platform cannot move more than half the physical array length per transmission without degrading the beam pattern. Thus, for any given array length NeD, the platform velocity cannot exceed $$v_p = \frac{N_e CD}{4R_{max}}$$

We would like to make maximum use of the available array length, that is, move a distance between transmissions equal to the entire array length rather than only half the array length. This would allow the velocity to double to $$v_p = \frac{C}{2} \frac{L_p}{R_{max}},$$

$L_p = N_e D$ = physical array length.

And that brings us to a new SAS technique.

A new synthetic aperture technique has recently been described that attempted to increase the velocity of SAS array. The principle is similar to VSAS in that a real array having multiple elements is used to form several beams per transmission. The differences are that (1) the receive array moves a distance between transmissions exactly equal to the array length, and (2) a very long projector array (at least equal to the length of the synthetic array) is required. The technique had two fatal drawbacks. Because a large plane wave had to be created, the projector pattern cannot be tailored to help suppress grating lobes arising from the spatially-undersampled hydrophone array, resulting in unacceptably large grating lobes in the composite beam pattern. Worse, the requirement for a large projector array violated the intent, which was to shorten the array and thus the towfish carrying it.

An that brings us to the present invention which has no such shortfalls.

DESCRIPTION AND OPERATION

A new means for synthesizing acoustic arrays has been developed that is optimally efficient in the sense that the platform can travel at a speed such that it moves one entire array length between transmissions as opposed to one-half an array length as is the case for conventional vernier SAS. The implementation is simple, yet elegant.

Figure 4:
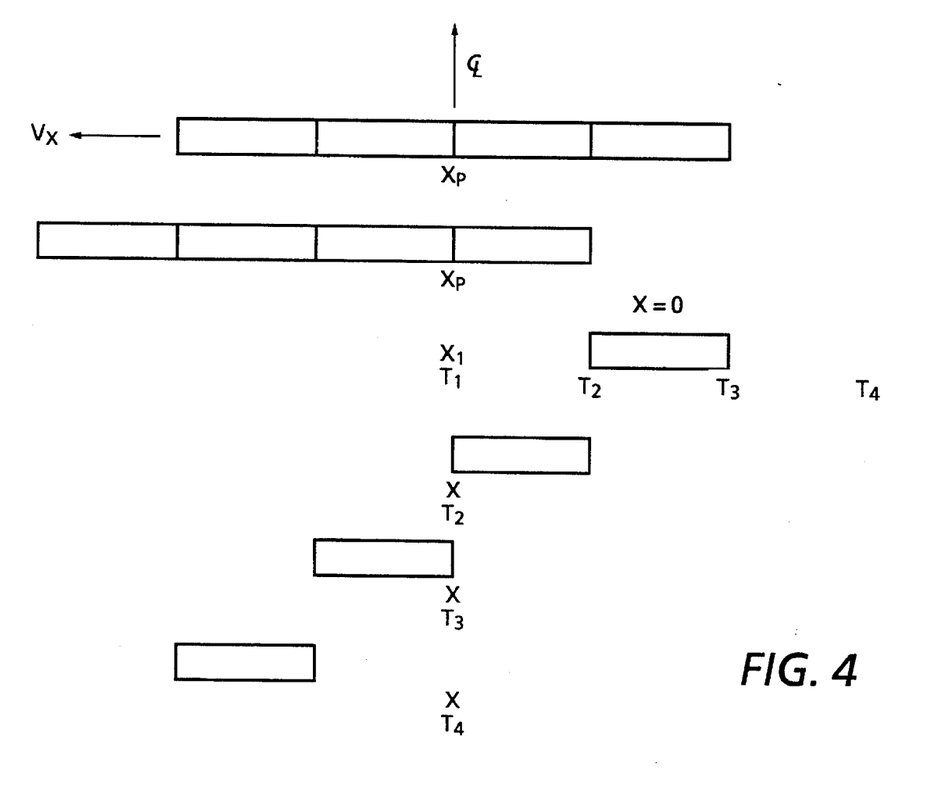
FIG. 4 is a view of a MOPSAS.

Consider a hypothetical system requirement for a real array of length L on a vehicle moving a distance L/4 between transmissions. A real array of length L is shown at the top of FIG. 4 at the time a transmit cycle starts. Below is shown the array at receive time for echoes from Rmax which is the same time as a new transmission cycle starts. We now illustrate how an array of one-fourth of L can be made to produce the same patterns as the real array. A hydrophone array of length L/4 is shown in the third line accompanied by four small projector elements (T1, T2, T3, T4) spaced at intervals of L/4. At the beginning of the cycle, projector T1 transmits at location Xp. Echoes are received on the hydrophone array and recorded as it moves to the left. At the end of the first transmission cycle, the received array is located with its leading edge at Xp and it is immediately obvious that it has sampled the same signals that would have been sampled by the right-hand quarter of the real array at the top. At this instant, a second transmission, identical in phase and amplitude to the first, is launched from the second projector, T2, which is now located at exactly the same position, Xp, as that from which the first transmission occurred. Thus, we are producing a synthetic aperture with monostatic (single location) projector and a multistatic hydrophone array. Hence the acronym MOPSAS (monostatic projector synthetic aperture sonar). This process continues for two more transmissions (by T3 and T4 at location Xp) to complete a four-transmission sequence. Now there are sufficient recorded echo samples to steer and focus the number of beams required to adequately sample the area of width L and length Rmax centered at Xp (only the right hand side of the SLS has been discussed for simplicity. A mirror image process occurs on the port side). Thus, we have accomplished with 4 small projectors and one short L/4 array a task that would have required a real array of length L or a synthetic array of L/2 with a conventional vernier SAS using the prior art.

Figure 5:
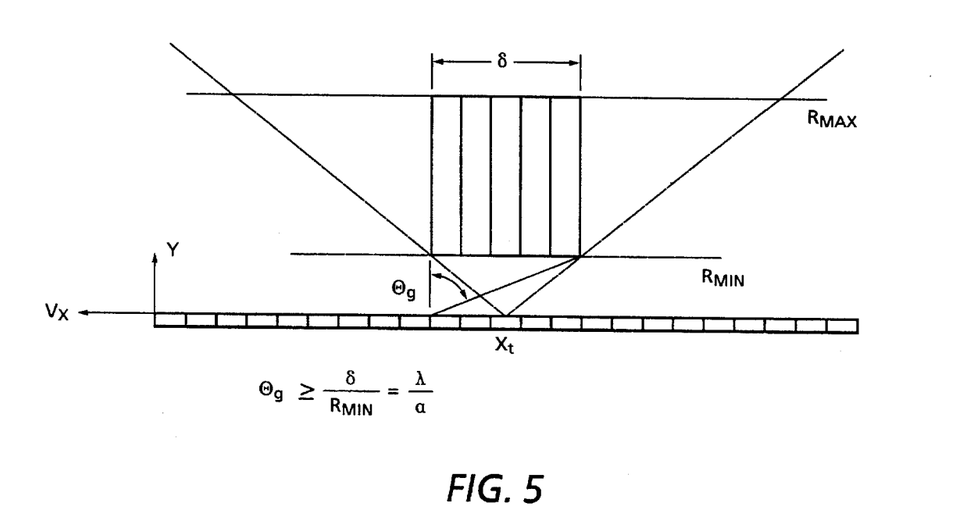
FIG. 5 illustrates design value selection.

The fact that a shorter array can be used does not reduce the number of elements in the array. The reason is shown in FIG. 5. In the case of a real array, the projector pattern is designed just broad enough to irradiate a width of δ at the minimum range of interest, Rmin, as shown in FIG. 5A. The element spacing d, is selected small enough that the first grating lobes of the array fall outside of the projector pattern so that ambiguous lobes are suppressed. The grating lobe angles, given by $$\theta_g = \sin^{-1}(\lambda/d)$$

must satisfy $$\theta_g \geq \delta/R_{min}$$

so that $$d \approx \frac{R_{min}\lambda}{\delta}$$

Figure 6:
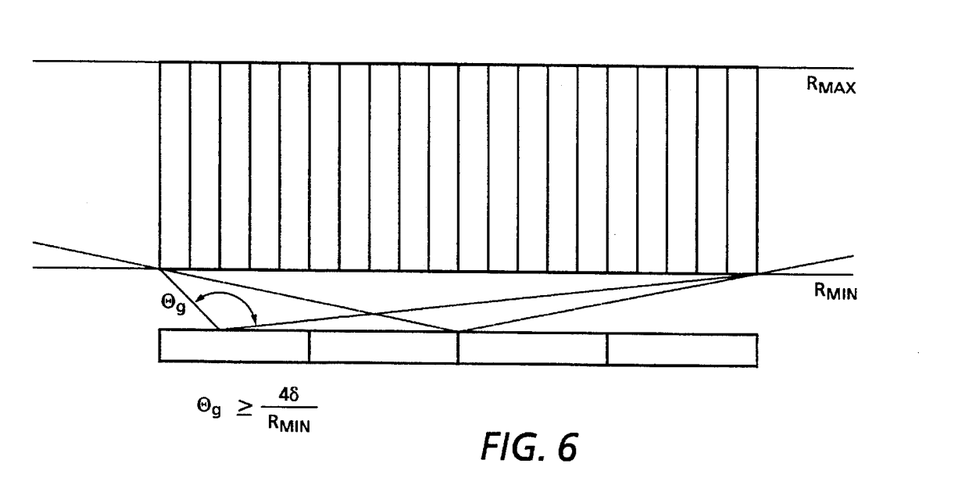
FIG. 6 shows receiver element spacing.

However, the projector pattern for the MOPSAS technique must be much wider (four times wider in our example) as shown in FIG. 6. Thus, the elements must be closer together to force the grating lobes outside the wider project pattern:

$$\theta_g{}^1 \geq \frac{4\delta}{R_{min}}$$

$$d^1 \approx \frac{R_{min}\lambda}{4\delta}$$

$$= d/4$$

Hence the element spacing is four times closer, but the physical array length is 4 times shorter, so the total element count remains the same as for the real array.

ADVANTAGES AND NEW FEATURES

For any given SLS array requirement, the towfish can travel at least twice as fast as a conventional SAS. Ignoring non-linear towfish motion, the beam patterns formed are indistinguishable from those of real (ideal) apertures.

Figure 7:
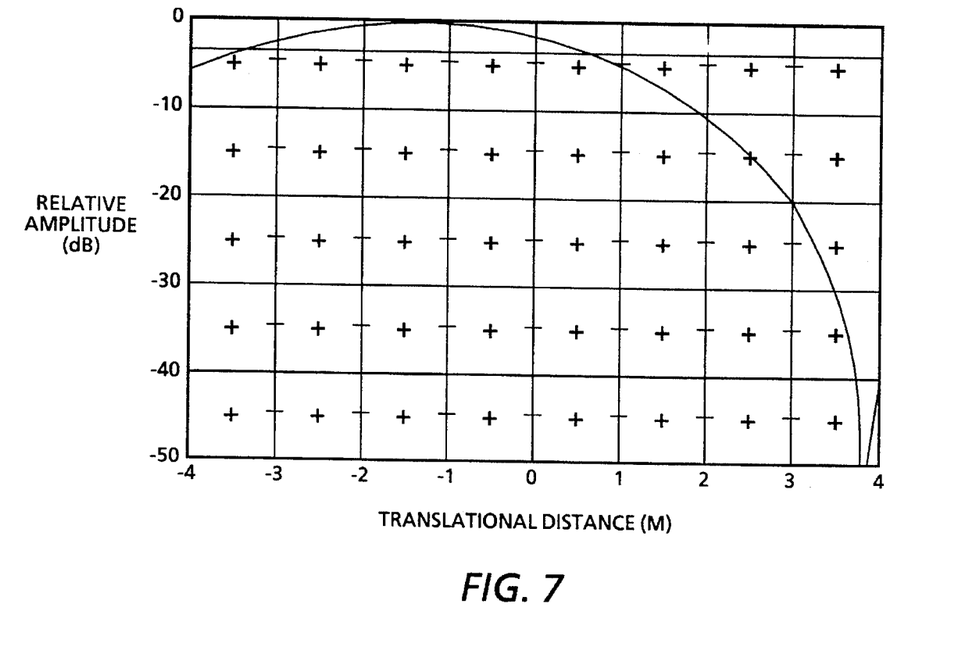
FIGS. 7 through 14 are views of various beam patterns.
Figure 8:
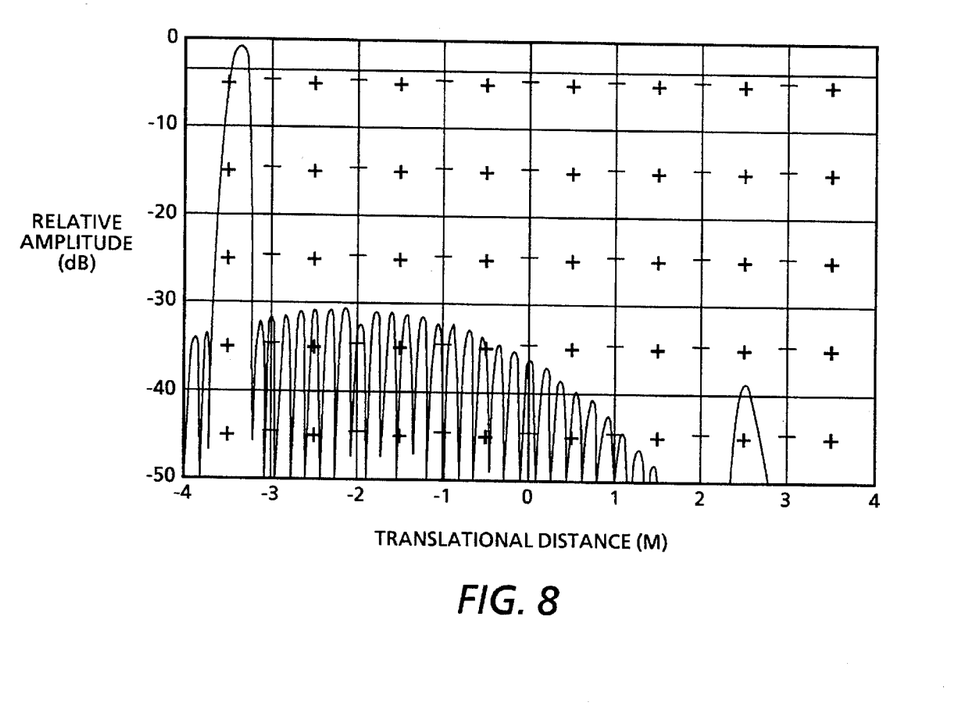
Figure 9:
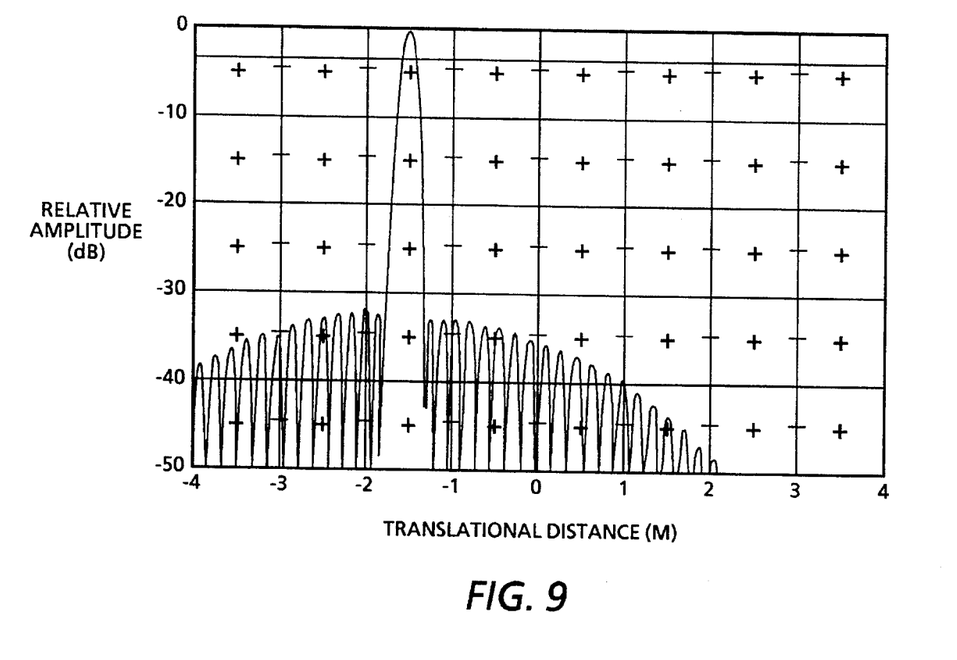
Figure 10:
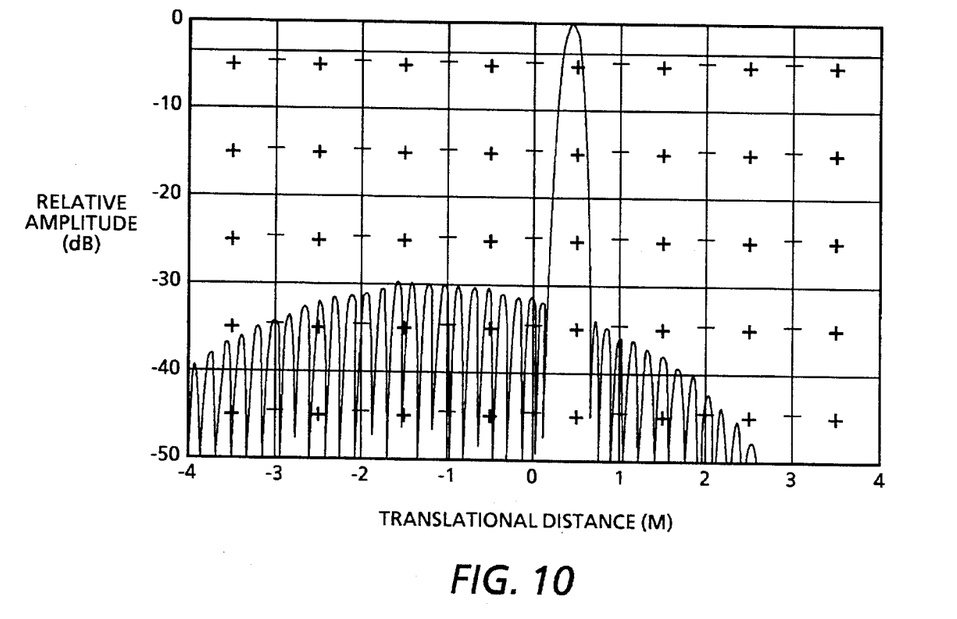
Figure 11:
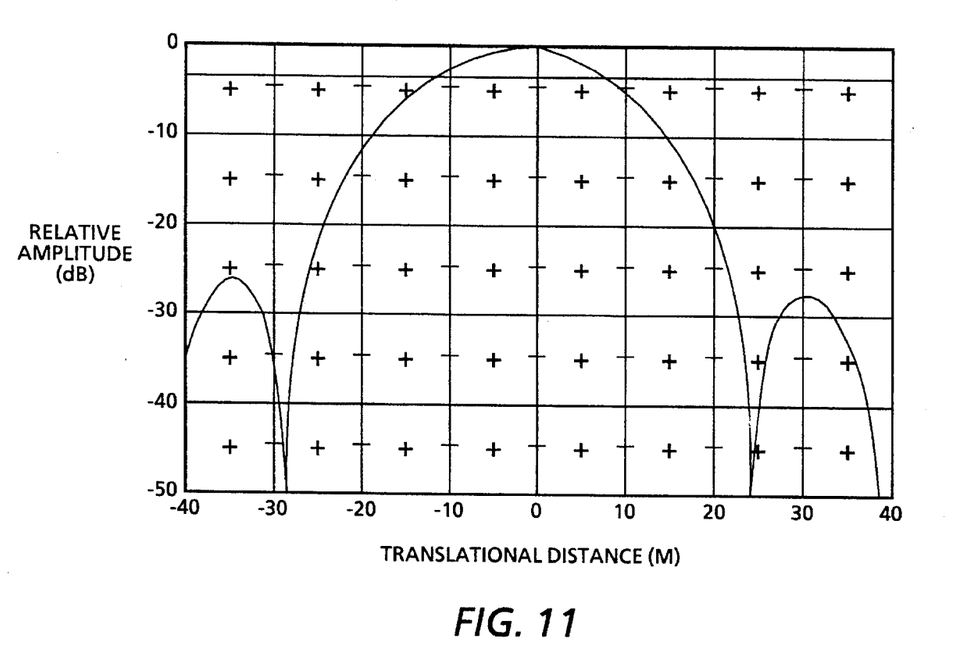
Figure 12:
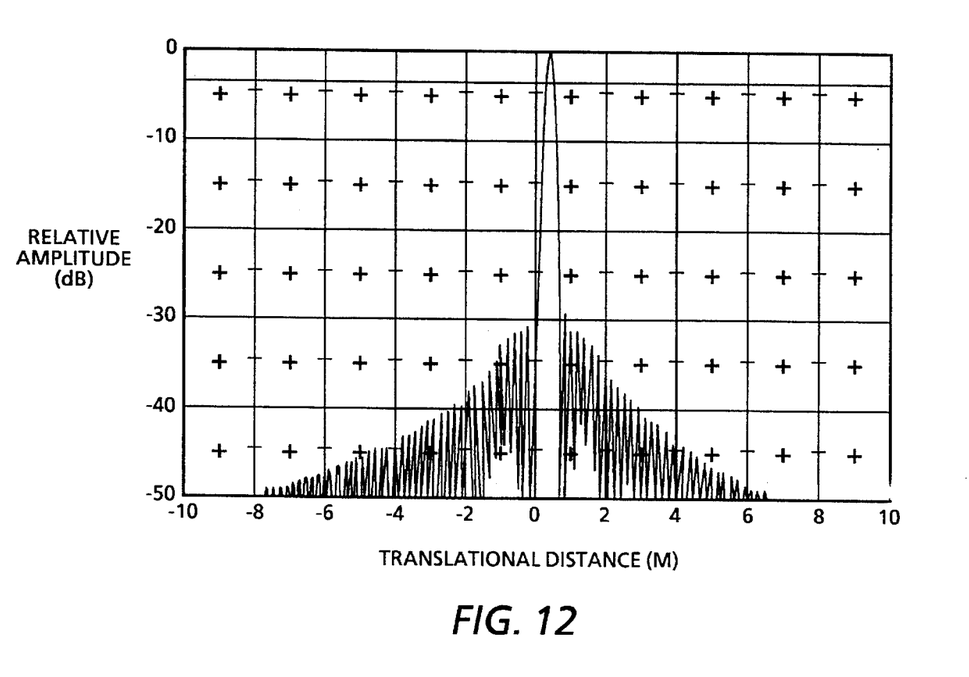
Figure 13:
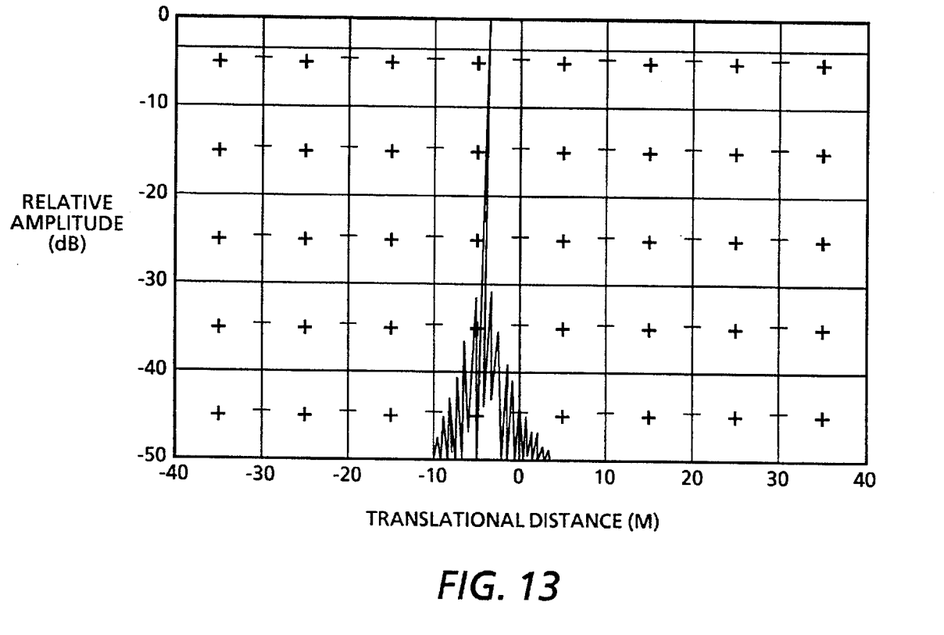
Figure 14:
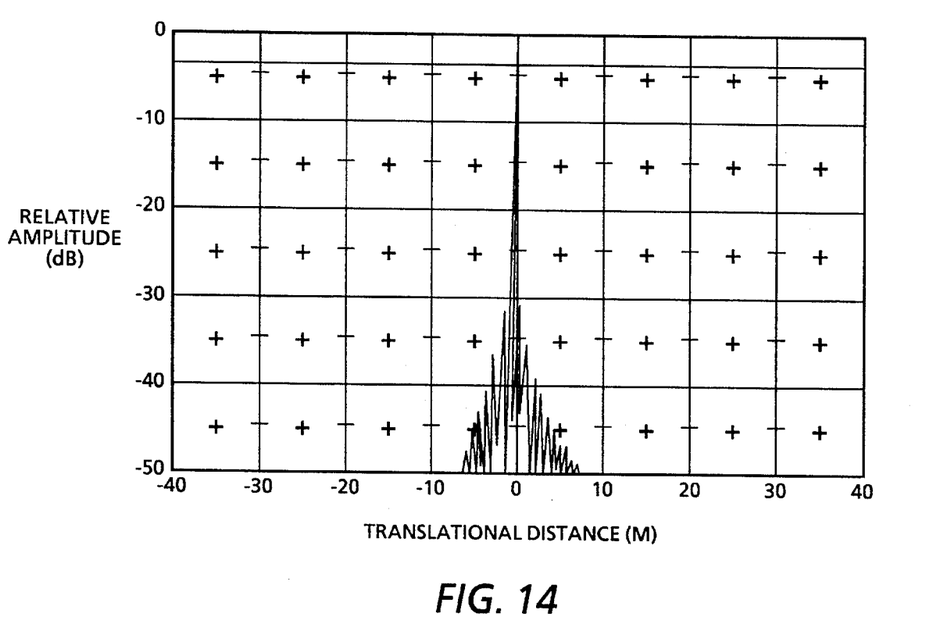

It can be shown that a monostatic projector is a fundamental requirement for producing beam patterns similar to those of a periodic real array when the physical array is allowed to move more than L/2 between transmissions. This fact is supported by the excellent theoretical MOPSAS patterns presented here. FIG. 7 shows a portion of the projector pattern at minimum range, and FIGS. 8 through 10 show the composite MOPSAS receive pattern for the rear beam, the center beam, and the forward beam at minimum range. Paradoxically, most side-scan sonars have their worst beam patterns at short ranges. The next set of FIG. 7 shows the projector pattern and the two worst case composite project/receive patterns at maximum range. FIG. 12 is an enlargement of FIG. 14 showing more detail.

Alternately the unambiguous transmission range can be at least twice that of conventional SAS (ignoring absorption loss).

The projector element need be no longer than the distance between transmissions.

The hydrophone array can move at least twice as far between transmissions as a conventional SAS, thus doubling the rate at which it can survey an area.

This invention uses the shortest possible hydrophone length of any known array device to produce any given resolution.

A multiplicity of small projectors is used to create a synthetic monostatic (fixed) acoustic source mounted on a moving vehicle.

ALTERNATIVES

It will be evident to those skilled in the art that the four-transmission example used herein to illustrate the process is arbitrary, and that the actual number will depend on the application at hand as is taught herein. Further the spacings and physical attachments will depend on the towfish structure available to the designer on a case basis.

It will be evident that the technique described herein applies equally to synthetic aperture radar (SAR) as well as SAS.

I claim:

1. A pulsed transmission, echo-ranging system comprising a body to be towed in a predetermined direction, a first array of transmitting elements having a length of $L_A(N_p-1)$ mounted on the towed body, and a second array of receiver elements having a length $L_A$ mounted on the towed body, wherein the towed body moves a distance $L_A$ between transmissions and wherein:

$$L_A = L_H + L_p$$

where $L_H$ is the distance traveled by the receiver array between transmissions, $L_p$ is the distance traveled by the transmitter array between transmissions and $N_p$ is the number of array elements.

2. A system according to claim 1 wherein the towed body moves a distance of $L_A$ while emitting $N_p$ transmissions.

3. A system according to claim 2 in which the system is a sonar system.

4. A system according to claim 2 in which the system is a radar system.

5. A pulsed transmission, echo-ranging system comprising a body to be towed in a predetermined direction, a first array of transmitting elements for transmitting a signal through a medium to a target located at a range R from the body and having a length of $L_A(N_p-1)$ mounted on the towed body, and a second array of receiver elements having a length $L_A$ mounted on the towed body, wherein the towed body moves a distance $L_A$ between transmissions and wherein:

$$L_A = L_H + L_p$$

where $L_H$ is the distance traveled by the receiver array between transmissions, $L_p$ is the distance traveled by the transmitter array between transmissions and $N_p$ is the number of array elements, and wherein $L_A$ is less than $R_{max}\lambda/\Delta x$ where $R_{max}$ = the maximum range to the target, $\lambda$ = the wavelength in the medium and $\Delta x$ = the azimuthal resolution of the signal.

6. A system according to claim 5 wherein the towed body moves a distance of $L_A$ while emitting $N_p$ transmissions.

* * * * *